April 6, 1965   W. R. FRAME   3,176,329
METHOD OF MAKING PARTIALLY HOLLOW RIVETS AND SIMILAR ARTICLES
Filed Jan. 8, 1964   5 Sheets-Sheet 4
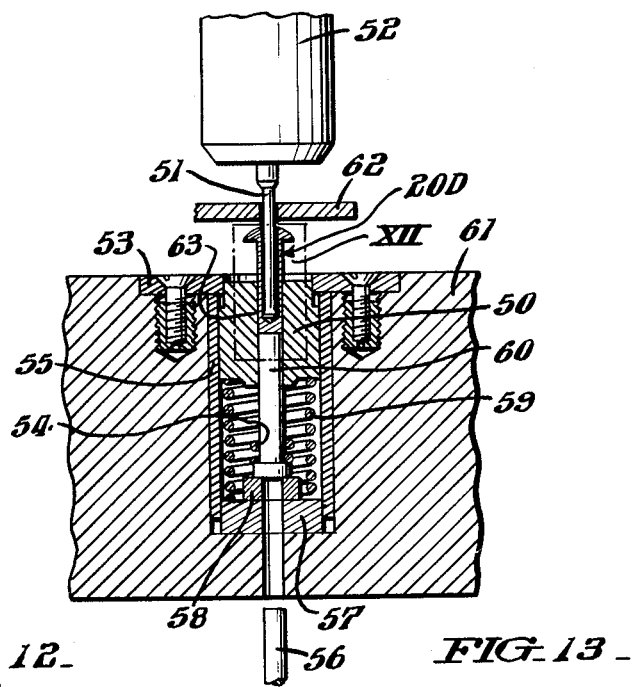
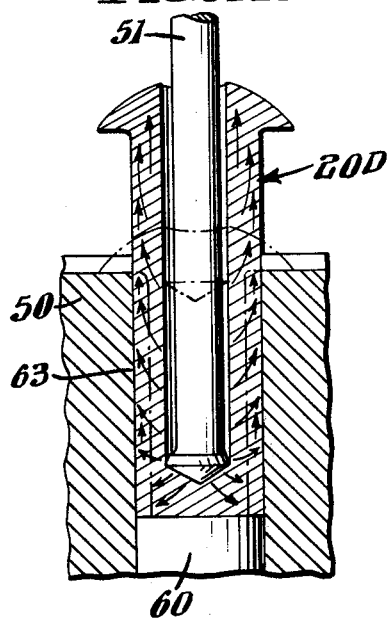
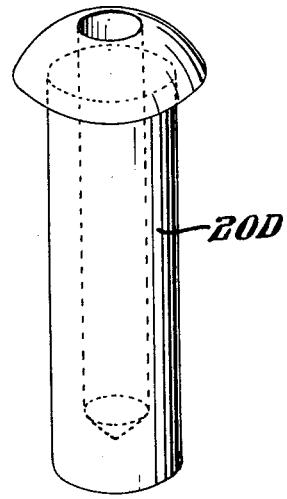
INVENTOR.
William R. Frame,
BY
Paul & Paul
ATTORNEYS.

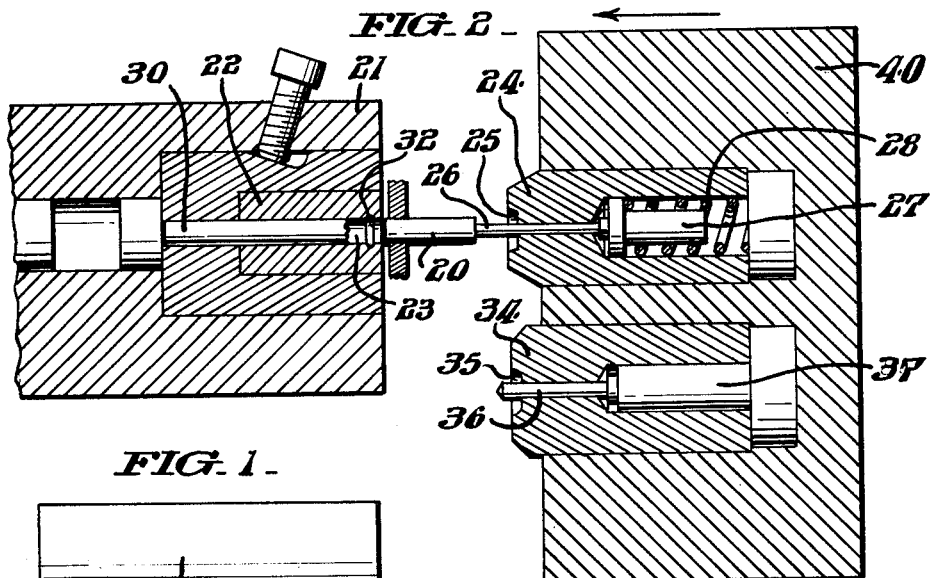

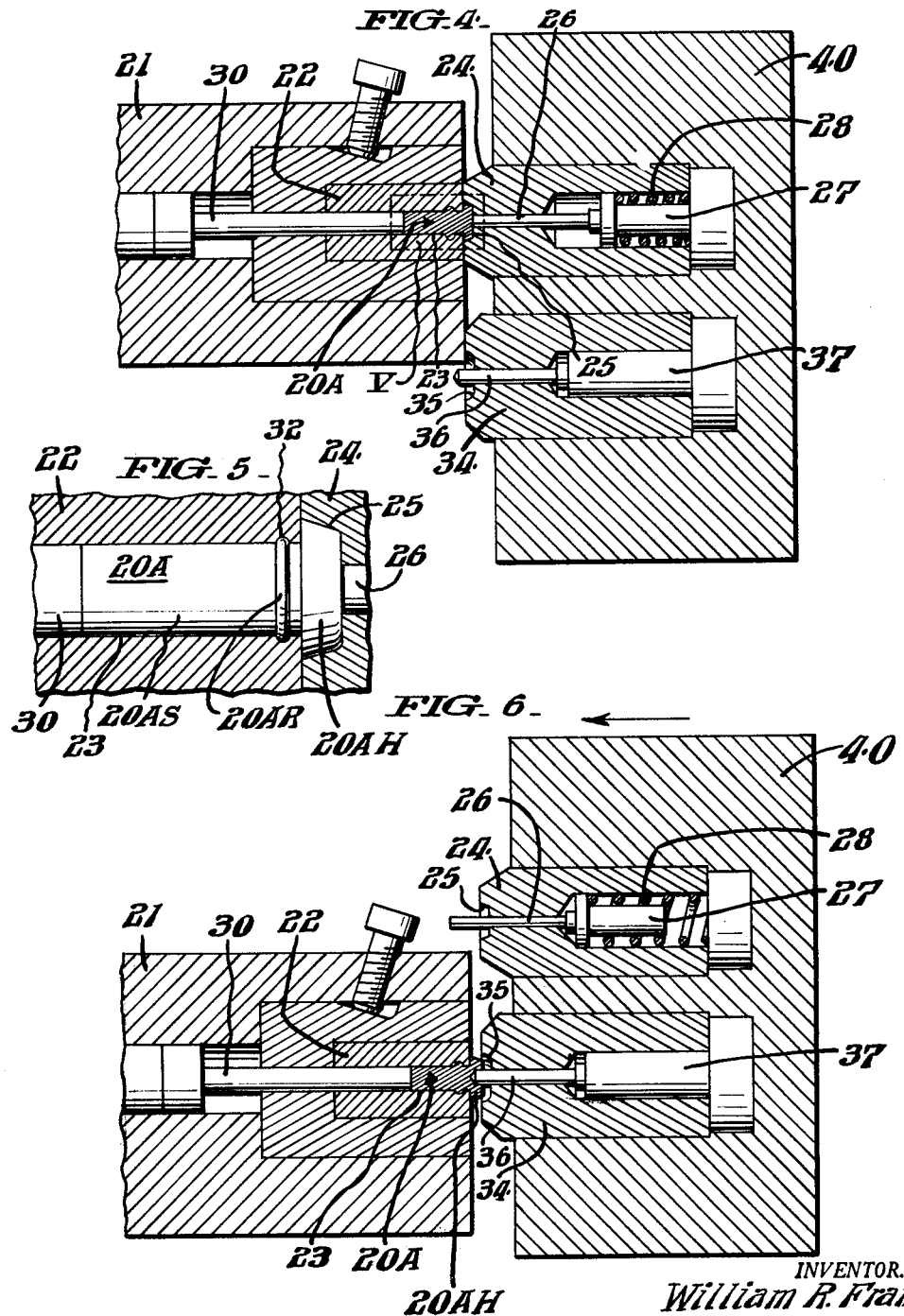

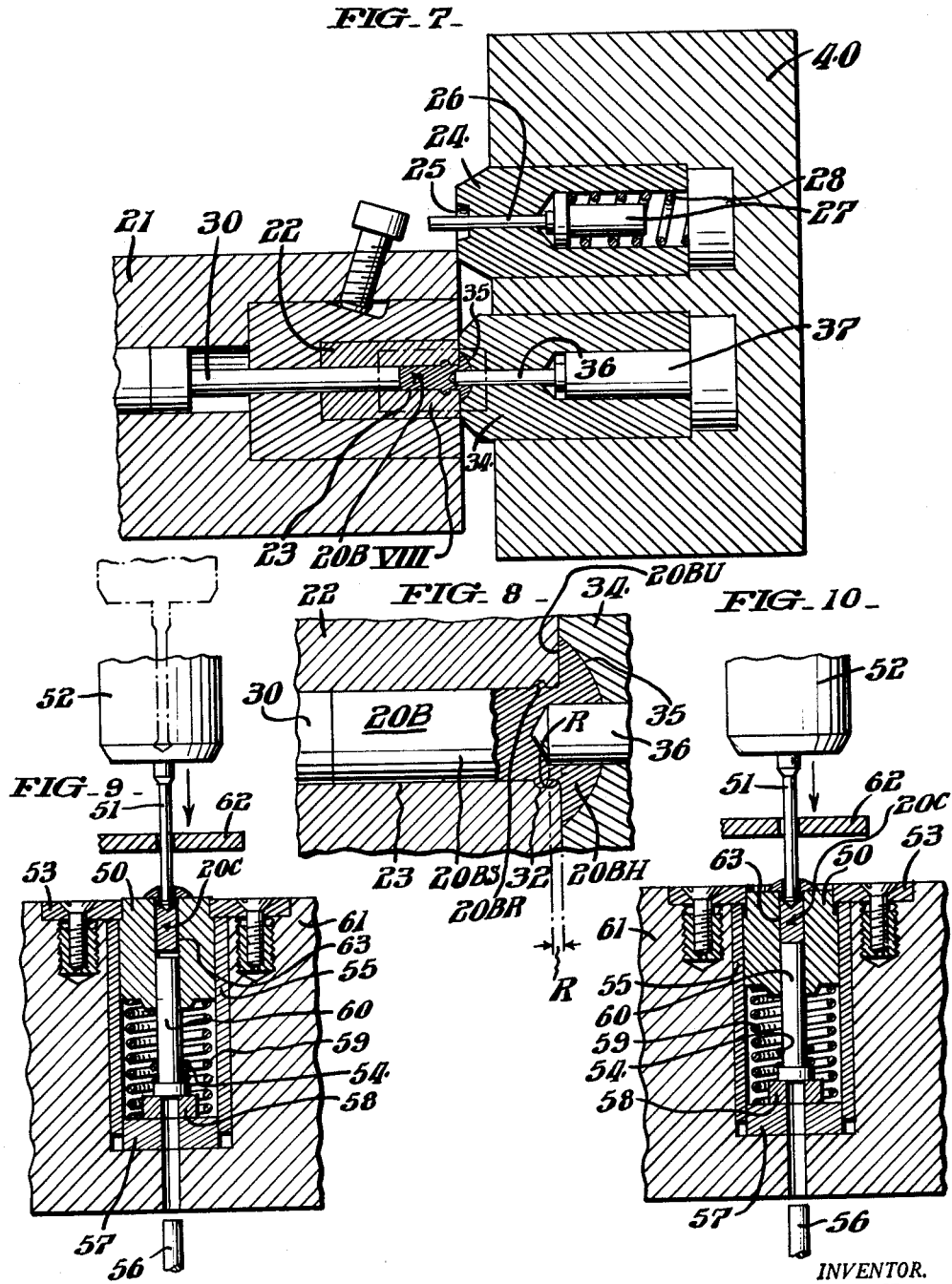

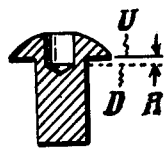
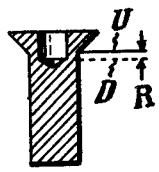
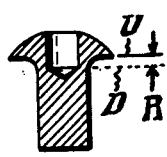
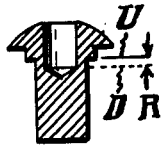
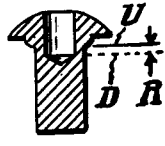
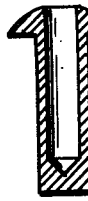
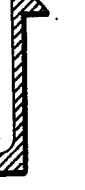
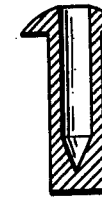
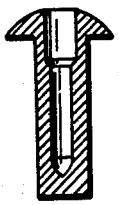

United States Patent Office 3,176,329
Patented Apr. 6, 1965

3,176,329
METHOD OF MAKING PARTIALLY HOLLOW
RIVETS AND SIMILAR ARTICLES
William R. Frame, Brookhaven, Pa., assignor to South
Chester Corporation, Lester, Pa., a corporation of
Delaware
Filed Jan. 8, 1964, Ser. No. 338,558
4 Claims. (Cl. 10—27)

This application is a continuation-in-part of my earlier-filed copending application, Serial No. 62,791, filed October 14, 1960, entitled "Method of and Apparatus for Making Partially Hollow Rivets and Similar Articles" and now abandoned.

This invention relates to a method of making metal articles, such as rivets and the like, having a head portion with a hole through the head portion leading into a shank portion. The method is particularly adapted to the making of rivets in which the hole terminates short of the far end of the shank, thereby to form a partially hollow rivet, whose head has a hole and whose shank has a cavity blind at the far end. The shank may have a circular, square, hexagonal or other cross section. The cross section of the head hole and shank cavity may be the same, or the shank cavity may be stepped down in cross-section.

According to my present invention, the partially hollow articles, such as rivets, are formed from cold heading rod wire held to close tolerances and free of all surface imperfections by a combination of operations comprising cold heading and cold back-extrusion.

The object of my present invention is to provide a chip-less method and means for making the above-described type of partially hollow rivet and like article without the need for drilling the rivet after leaving the heading machine.

My new method of cold heading and cold back-extrusion produces rivets and like articles having excellent surface finish, strength and toughness, favorable grain positioning, minimum waste, and minimum rejects. The hole produced by the back-extrusion operation has extremely smooth walls. The grain of the metal flows out to follow the part contours, avoiding the surface weakness sometimes found in many machined parts. With the tooling properly adjusted and locked in position, the diameter and depth of the hole produced by my present method are easily controlled and remarkably consistent from one part to the next. Furthermore, hole and shank concentricity are more accurately controlled and easier to duplicate. My process can be used to produce parts of different diameters, different shank shapes and various head shapes in several different metals and their alloys, including aluminum, steel, copper and brass.

My invention will be clearly understood from a consideration of the following detailed description of my method as applied to the production of a partially hollow rivet illustrated in the drawing in which:

FIG. 1 is a rivet blank;

FIGS. 2, 3 and 4 are sequential views illustrating the operation of a conventional-stroke single-die cold header;

FIG. 5 is an enlarged view of the area identified V in FIG. 4;

FIGS. 6 and 7 illustrate the operation of punching a hole through the head and into the shank of the cold-headed partially formed rivet;

FIG. 8 is an enlarged view of the area identified VIII in FIG. 7;

FIGS. 9, 10 and 11 are sequential views illustrating the operation of back extruding to form the partially hollow shank terminating in a blind cavity at the far end;

FIG. 12 illustrates how the metal flows during the back extruding operation; and FIG. 13 is a perspective view of the completed partially hollow rivet of FIG. 12.

FIGS. 14–20 are elevational views, in section, illustrating, at the head-piercing stage, some of the various head shapes which the rivets may have;

FIGS. 21–25 are plan views, in section, illustrating some of the various cross sections the pierced hole in the heads of FIGS. 14–20 may have;

FIGS. 26–30 are elevational views, in section, illustrating some of the various shapes the bottom of the pierced hole in the heads of FIGS. 14–20 may have; and FIGS. 31–40 are elevational views, in section, illustrating some of the various shapes of bore which the final rivet may have.

In describing the preferred embodiment of the invention illustrated in the drawing, specific terminology has been resorted to for the sake of clarity. However, it is not the intention to be limited to the specific terms so selected, and it is to be understood that each specific term includes all technical equivalents which operate in a similar manner to accomplish a similar purpose.

Referring now to FIGS. 1 through 5 of the drawing, the following reference numerals represent the following parts: 20 is a rivet blank of metal of solid cylindrical shape. 21 is the die having a die insert 22 with an axial cavity 23 having therein a die knockout pin 30. The die cavity shown has an annular recess 32 near the front face of the die. 40 is the press ram having mounted therein a punch 24 having a cone-shaped cavity 25 and a protruding axial pin 26 spring loaded by a spring pilot 27 and a compression spring 28. Press ram 40 also has mounted therein a finish punch 34 having an arcuate cavity 35 and a protruding punch pin 36 backed solidly against a spacer 37. The depth of arcuate cavity 35 is equal to or slightly less than the depth of cone cavity 25.

In operation, after the rivet blank 20 (FIG. 1) is sheared from the wire stock and transferred to the center line of the die-cavity 22 (FIG. 2), as by a cutter and finger (not shown), the cone punch 24 in the ram 40 is moved forwardly toward the die 21, and the spring-loaded pin 26 pushes the rivet blank 20 into the die cavity 23. The rivet blank 20 becomes seated against the die knock-out pin 30, which retreats to the stop position seen in FIG. 3. Further forward movement of the ram 40 causes the pin 26 to retreat into the punch 24, compressing the spring 28, and, as seen in FIG. 3, leaving a portion of the rivet blank 20 protruding from the face of die 22.

As the cone punch 24 continues its forward movement, the protruding portion of metal of the blank 20 is upset and is forced to flow simultaneously into the cone-shaped cavity 25 of cone-punch 24 and also into the annular recess 32 of die cavity 23, as seen in FIG. 4. In this manner, a preformed or preliminary part is produced shown in enlargement in FIG. 5. This partially finished part, which will be identified herein as 20A has a solid cylindrical shank 20AS, a frusto-conical head 20AH which for convenience is referred to herein merely as a coned head, and, in the particular form shown in the drawing, having a ring-like protrusion 20AR near the head end.

As the ram 40, having passed through forward dead center, retreats from the face of the die 22, the finished punch 34 is pivoted into position. As ram 40 again moves forward, pin 36 in the finish punch 34 pierces the coned head 20AH of part 20A, as shown in FIG. 6, and during the last portion of the forward stroke, the pin 36 forces the metal of part 20A to back extrude out of the die cavity 23 into the arcuate shaped cavity 35 of the finish punch 34, filling the cavity 35 at the forward dead center position of the ram 40, as seen in FIG. 7. The part 20A which had a coned preliminary head has now been given a round final head, as seen in the enlarged view of FIG. 8, and will be identified as part 20B.

Particular attention is now directed to FIG. 8 which shows the pin 36 in its most forward position, with ram 40 at forward dead center. In accordance with my present invention, when, as will ordinarily be the case, it is desired that little or no radius or taper should occur on the finished article at the junction of the peripheral surface of the shank with the under surface of the head, the most forward position of pin 36 is such that the full diameter of the hole (made by pin 36 in the head 20BH of part 20B) should extend into the shank 20BS and below the under-surface 20BU of the round final head 20BH by a distance equal at least to R, where R is the radius of curvature of the junction of the peripheral surface of the shank 20BS with the under-surface 20BU of the head. I have found that when pin 36 penetrates the shank to this extent, there is little or no tendency for the radius R to change size, shape or location during the back-extruding operation yet to be described, but that with a lesser penetration, the radius of curvature R at the junction of the shank periphery and head under-surface tends to change to an undesirable extent.

In FIG. 8, the final head 20BH is illustrated as being a round head with a flat under-surface 20BU. The method of this present invention is, however, not limited to such form of head. FIGS. 14-20 illustrate a variety of head forms, to all of which the method of the present invention is applicable. In each case, the solid line U indicates the under-side of the head, as this expression is used in the claims. The dotted line D indicates the initial depth of the hole pierced by the pin 36. In each case, the depth of the hole D is at least R below U, where R is the radius of curvature of the junction of the shank and the undersurface U of the head, whatever shape that undersuface may have. Stated another way, the final head is pierced by the piercing pin at least to the dotted line D, where D is the inflection point located at the intersection of the right cylinder (or any other shape) of the shank portion with the shape of the head-shank junction.

Referring again to FIGS. 7 and 8, as ram 40 leaves forward dead center position and starts back, the protruding ring 20BR of part 20B, being in the recess 32 of die cavity 23, acts to retain the part 20B in die cavity 23 as the pin 36 of the punch 34 strips free of the part 20B.

With ram 40 in back position, the knock-out pin 30 of die 22 is activated to push the part 20B out of the cavity 23 of the die 22. When this occurs, the metal trapped in the die ring 32 merely irons out as the part 20B moves out of the die cavity and very slightly elongates the shank of the part along its periphery. The part without the protruding ring will be identified as 20C.

In the operations just described, both the tools and the rivet blank are preferably lubricated in order to eliminate metal to metal contact, there by eliminating metal pick-up on the tools.

The partially completed part 20C is then cleaned and automatically fed to and inserted in a die station which in a typical machine will be one of many such stations mounted in a dial plate that is an integral part of a press having a dial feed. Such a station is shown in FIGS. 9-11.

Referring now to FIGS. 9-11, there is shown a die station comprising the spring-loaded die 50 retained by retainer plate 53 in a dial plate 61. The compression spring 59 for die 50 is contained between the die and a thrust plate 57. Located axially in the die 50 is a die knockout pin 60 adapted to be moved forwardly against the action of a knockout-pin compression spring 54 by a knockout pin 56. Between the knockout pin 60 and the thrust plate 57 is an interchangeable thrust plate spacer 58, different spacers being used for shanks of different lengths. Surrounding the thrust plate 57 and between the die retainer plate 53 and dial plate 61 is a steel liner 55 for guiding the die 50.

Facing die station 50 is a press ram (not shown) having mounted therein a punch 52 for retaining and guiding an extruding pin 51 attached to the press ram. Also shown in FIGS. 9-11 is a rivet stripper plate 62.

In operation, after the part 20C has been inserted and seated in the cavity 63 of die 50 (die 50 not then being under the punch 52), the part 20C is lubricated, and then the dial plate 61 indexes, placing that particular station under the ram of the press. The extruding punch 52 and its pin 51 advance downwardly toward the part 20C and, as shown in FIG. 9, the extruding pin 51 enters into the hole which is already in the final head of the part as a result of previous operations, described above. In FIG. 9 the part 20C is not yet seated on the die knockout pin 60, as will be seen by the space in the cavity 63 between the bottom of the shank of part 20C and the top of the die knockout pin 60.

As punch 52 and pin 51 continue their downward movement with pin 51 in the hole in the final head of the partially-formed rivet part 20C, the undersurface of the part head exerts pressure on the face of the die 50 and the die moves downwardly compressing the die spring 59 until the bottom of the shank of part 20C contacts the top of the knockout pin 60, as illustrated in FIG. 10.

Further downward movement of the punch 52 and pin 51 causes the metal of part 20C to fill out against the sides of the die cavity 63 and the part 20C is then forced to back-extrude out of the cavity 63 of die 50, as illustrated in FIG. 11, without altering the shape of the final head, the flow of metal being substantially as indicated in FIG. 12.

At the conclusion of the downward stroke, the extruding pin 51 is above the far end of the shank of the now elongated and completed rivet, which will be called 20D.

The punch 52 and pin 51 now retreat from the die 50. If the rivet 20D sticks to the pin 51 instead of remaining in the die cavity 63, the rivet will be stripped from the pin by the stripper plate 62 as the pin 51 continues its retreat up through the hole in the stripper plate. The stripper plate 62 is so positioned that when the head of the rivet 20D strikes the stripper plate, a portion of the rivet shank is still in the die cavity 63 so that, when the die station 50 is indexed out from under the stripper plate 62 to another dwell point, the rivet 20D is carried with the die 50. The rivet 20D is then ejected from the die 50 by the combined action of knockout pins 56 and 60. Pin 56 is moved upward until the top of said pin passes through the concentric round holes in the dial plate 61, thrust plate 57, and the interchangeable thrust plate 58, hence contacting the bottom of the knockout pin 60, and as pin 56 continues its upward movement, the combination of pins 56 and 60 eject rivet 20D from the die cavity.

The die assembly shown in FIGS. 9, 10 and 11 need not necessarily be in a separate machine but can be an integral part of a progressive or transfer type header. In such case, the die 50 would be held against the spring 59 by a typical header method instead of by the retainer plate 53.

If done in a header, the stripper plate 62 would be moved out of the path of the part 20D as the part is ejected out of the die 50 by the header knockout pin. Also, the stripper could be an integral part of the punch mechanism if the action is carried through in a header.

While I have described the method and means of my invention as applied to a two-blow single die cold header and a dial-fed press, each operation could be accomplished in a separate machine or if desired all operations could be accomplished in one machine.

If the head of the desired part is of relatively large volume, two or more blows may be required to accomplish the coning operating alone. In this case, a sliding spring-loaded die or a sliding sleeve cone punch would be of advantage.

If, as an integral part of the finish-punch tool (34, 35, 36, 37) a mechanical pin-stripper be used, the annular recess 32 in the die cavity 23 can be eliminated since the retaining action of the ring formed on the shank of the part by the recess 32 would be unnecessary.

Many different shapes of piercing and extruding pins can be used, as for example, stepped, tapered, round, hexagonal, square and blunt.

The cross-section of the pierced hole in the rivet head may have different shapes, some of which are illustrated in FIGS. 21–25, and the bottom of the pierced hole may have different shapes, such as are illustrated in FIGS. 26–30.

The cross-section of the bore of the finished rivet may be of uniform diameter, such as illustrated in FIGS. 31–34, or the bore may be stepped, as illustrated in FIGS. 35–39. In most cases, the bore will be closed at the bottom, as in FIGS. 31–38, but need not be, as illustrated by the through-holes in FIGS. 39–40.

While the preferred embodiments of the method of the present invention have been described in some detail, it will be obvious to one skilled in the art that various modifications may be made without departing from the invention as hereinafter claimed.

Having described my invention, I claim:

1. The method of forming out of a solid metal blank of rod stock a rivet element having an axial bore extending through the head and into the shank, said method comprising the steps of placing the blank in a substantially corresponding opening in a confining block but leaving one end portion of the blank projecting from the opening, pre-forming a preliminary head by upsetting said projecting end portion by a force applied in the axial direction, substantially simultaneously axially piercing and finish-upsetting the preformed head to form a final head having an axial bore therethrough, said piercing extending into the shank at least to the depth R, where R is the radius of the junction of the shank and the undersurface of the head and confining only the shank of the final-headed blank while applying axial force to the bottom of the bore formed by said piercing to cause metal to back extrude without altering the shape of the final head.

2. The method according to claim 1 in which said axially-applied force is discontinued before the bore reaches the distal end of the shank.

3. The method of forming out of a solid metal blank of rod stock a rivet element having an axial bore extending through the head and into the shank, said method comprising the steps of placing the blank in a substantially corresponding opening in a confining block but leaving one end portion of the blank projecting from the opening, pre-forming a preliminary head by upsetting said projecting end portion by a force applied in the axial direction, substantially simultaneously axially piercing and finish-upsetting the preformed head to form a final head having an axial bore therethrough, said piercing extending into the shank at least to a point D, where D is the inflection point located at the intersection of the shank with the shape of the head-shank junction, and confining only the shank of the final-headed blank while applying axial force to the bottom of the bore formed by said piercing to cause metal to back extrude without altering the shape of either the final head or the junction of the initial headed shank and head.

4. The method according to claim 3 in which said axially-applied force is discontinued before the bore reaches the distal end of the shank.

References Cited by the Examiner
UNITED STATES PATENTS

| | | | |
|---|---|---|---|
| 2,216,201 | 10/40 | Keller | 10—27 |
| 2,331,324 | 10/43 | Jakosky | 10—27 |
| 2,361,771 | 10/44 | Huck | 10—27 |
| 2,586,336 | 2/52 | Huck | 10—27 |
| 2,628,514 | 2/55 | Frist | 10—12.5 |
| 2,843,862 | 7/58 | Smith | 10—24 |
| 2,953,247 | 9/60 | Walter | 10—27.1 |

ANDREW R. JUHASZ, *Primary Examiner.*